United States Patent
John et al.

(10) Patent No.: US 7,584,719 B2
(45) Date of Patent: Sep. 8, 2009

(54) APPARATUS AND METHOD FOR RESTRAINING A LABORATORY ANIMAL

(75) Inventors: Janet Dell John, Florence, NJ (US); Waldemar Ruediger, New Hope, PA (US)

(73) Assignee: Bristol-Myers Squibb Company, Princeton, NJ (US)

( * ) Notice: Subject to any disclaimer, the term of this patent is extended or adjusted under 35 U.S.C. 154(b) by 361 days.

(21) Appl. No.: 11/436,922

(22) Filed: May 19, 2006

(65) Prior Publication Data
US 2007/0266956 A1    Nov. 22, 2007

Related U.S. Application Data

(60) Provisional application No. 60/682,138, filed on May 18, 2005.

(51) Int. Cl.
*A01K 1/03*    (2006.01)
*A01K 1/00*    (2006.01)
*A01K 15/04*    (2006.01)

(52) U.S. Cl. .................. 119/417; 119/416; 119/751; 119/752

(58) Field of Classification Search .............. 119/417, 119/453, 801, 804, 751, 752, 482
See application file for complete search history.

(56) References Cited

U.S. PATENT DOCUMENTS

| | | | | | |
|---|---|---|---|---|---|
| 186,945 | A | * | 2/1877 | Ogborn | 119/732 |
| 266,942 | A | * | 10/1882 | Wilkins | 119/736 |
| 427,145 | A | * | 5/1890 | Bogard | 119/736 |
| 3,509,855 | A | * | 5/1970 | Priddy, Jr. | 119/497 |
| 5,967,090 | A | * | 10/1999 | Hui | 119/497 |

* cited by examiner

*Primary Examiner*—Michael R Mansen
*Assistant Examiner*—Monica L Williams
(74) *Attorney, Agent, or Firm*—Terence J. Bogie

(57) ABSTRACT

An animal restraint includes first and second upright plates. A plurality of bars, each having a first end mounted to the first plate and a second end mounted to the second plate, form an enclosure that is dimensioned to closely receive an animal. The plurality of bars further include at least one gate bar having a first end that is slidably mounted to the first plate and a second end that is slidably mounted to the second plate. The gate bar is slidable along a defined path between a closed position, in which the gate bar blocks an opening in the enclosure, and an open position, in which the gate bar is clear of the opening.

9 Claims, 7 Drawing Sheets

APPARATUS AND METHOD FOR RESTRAINING A LABORATORY ANIMAL

This application claims priority benefit under Title 35 § 119(e) of U.S. provisional Application No. 60/682,138, filed on May 18, 2005, the contents of which are herein incorporated by reference.

BACKGROUND OF THE INVENTION

1. Field of the Invention

The present invention relates generally to improvements in the field of animal restraints, and more particularly to advantageous aspects of an improved apparatus and method for restraining a laboratory animal.

2. Description of Prior Art

In laboratory and veterinary environments, there is often a need to temporarily restrain animal subjects, such as rats, mice, and the like. Conventionally used animal restraint systems suffer from a number of disadvantages. One such animal restraint system provides a cage having a number of removable restraining rods that are held in position with nuts. In order to load an animal into the cage, the restraining rods must be completely removed from the cage by loosening the nuts, thereby creating an opening to receive the animal. Once the animal is in position within the cage, the restraining rods are reinstalled into the cage and the nuts are retightened. However, the loading of an animal into the restraint having this construction is a cumbersome procedure, typically requiring the cooperation of multiple personnel to hold the animal in position within the cage while simultaneously reinstalling the restraining rods and retightening the nuts. Additionally, such a restraint system is difficult to clean. Moreover, with restraints having this type of construction with a number of removable parts, it is possible for these parts to become lost, or to be accidentally dropped or misplaced during the process of loading an animal into the restraint.

SUMMARY OF THE INVENTION

An aspect of the present invention provides an animal restraint that is operable by a single user. In one embodiment, the restraint includes first and second upright plates. A plurality of bars, each having a first end affixed to the a planar surface of the first plate and a second end affixed to a planar surface of the second plate, form an enclosure for closely receiving an animal, such enclosure further defining an opening for accommodation of a gate bar among the plurality of bars. The plurality of bars may include spacer bars, which are cooperatively positioned around the perimeter of the planar inner surfaces of the first and the second plate, and at least one floor bar, and further includes at least one gate bar having a first end that slidably contacts a planar surface of the first plate and a second end that slidably contacts a planar surface of the second plate. The gate bar is slidable along a defined path, preferably in a horizontal plane, between a closed position, in which the gate bar blocks an opening in the enclosure, and an open position, in which the gate bar is clear of the opening.

Additional features and advantages of the present invention will become apparent by reference to the following detailed description and accompanying drawings.

DETAILED DESCRIPTION

Figure 1:
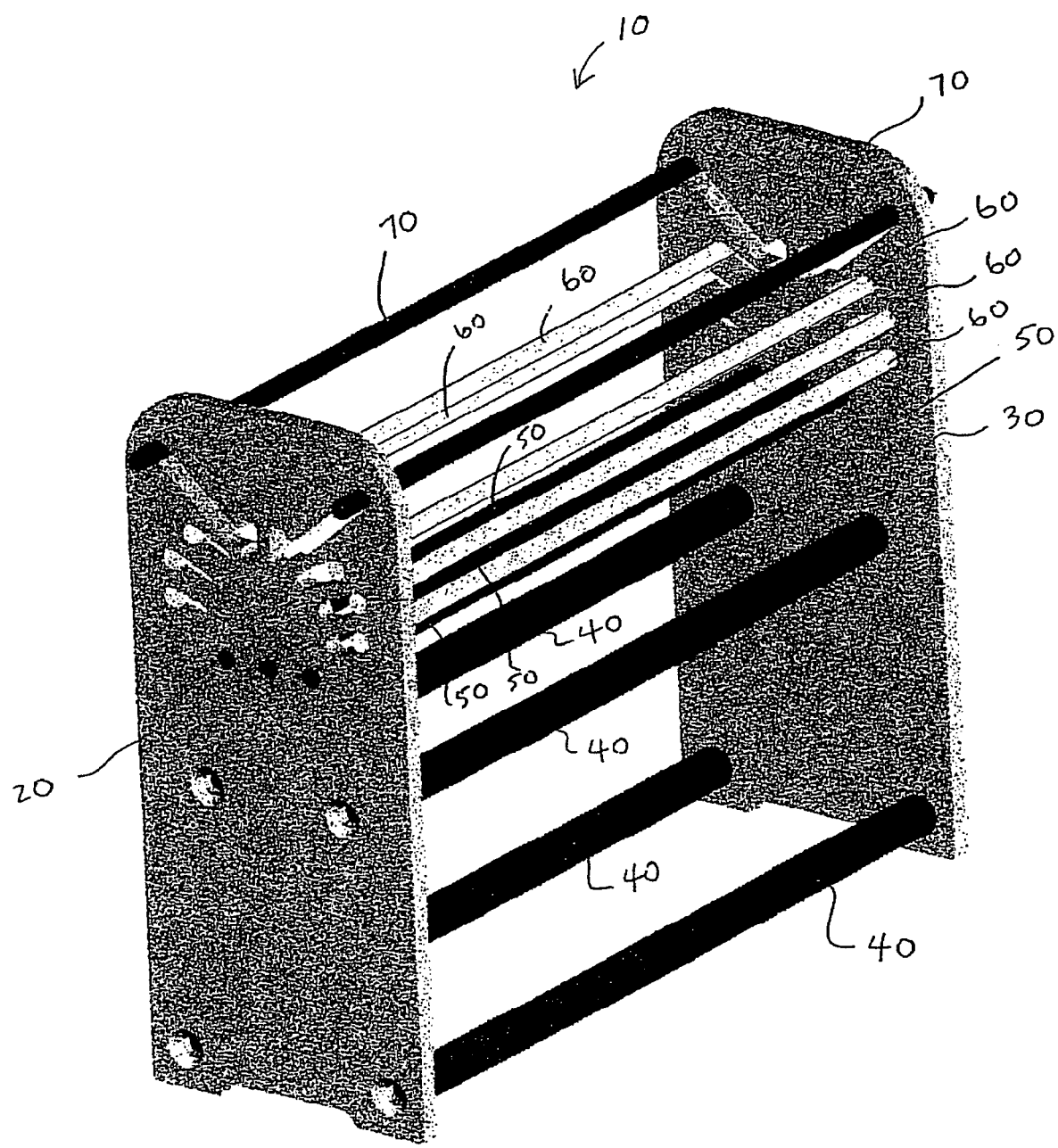
FIG. 1 shows an isometric view of an animal restraint according to a first aspect of the invention.

FIG. 1 shows an isometric view of an animal restraint system 10 according to a first aspect of the invention. The restraint system 10 includes first and second upright plates 20 and 30 that are substantially parallel with each other. When resting on a laboratory bench or other work surface, the plates 20 and 30 are substantially vertical. Extending between the plates 20 and 30 are a plurality of bars: four spacer bars 40, three floor bars 50, six side bars 60, and two gate bars 70. The bars 40, 50, 60 and 70 are cylindrical in shape, and are positioned substantially parallel with each other and perpendicular to the upright plates 20 and 30. When the restraint system 10 is resting on a work surface, the bars 40, 50, 60 and 70 are substantially horizontal. As described in further detail below, the spacer bars 40 provide structural support. The floor bars 50 and side bars 60 define an enclosure that is dimensioned to closely receive an animal. The gate bars 70 are moved back and forth between a closed position, in which they block an opening in the enclosure, and an open position, in which they are clear of the opening in the enclosure. According to the present aspect of the invention, the plates 20 and 30 and bars 40, 50, 60 and 70 are fabricated from stainless steel. In addition to being strong and durable, stainless steel is easy to clean and can be sterilized in a heat sterilization unit. The invention is not limited to a specific number of spaces, floor or gate bars, but rather the number and placement of these bars may be selected by one skilled in the art in accordance with the desired size of the restraint system and the size of animals to be accommodated therein.

Figure 2:
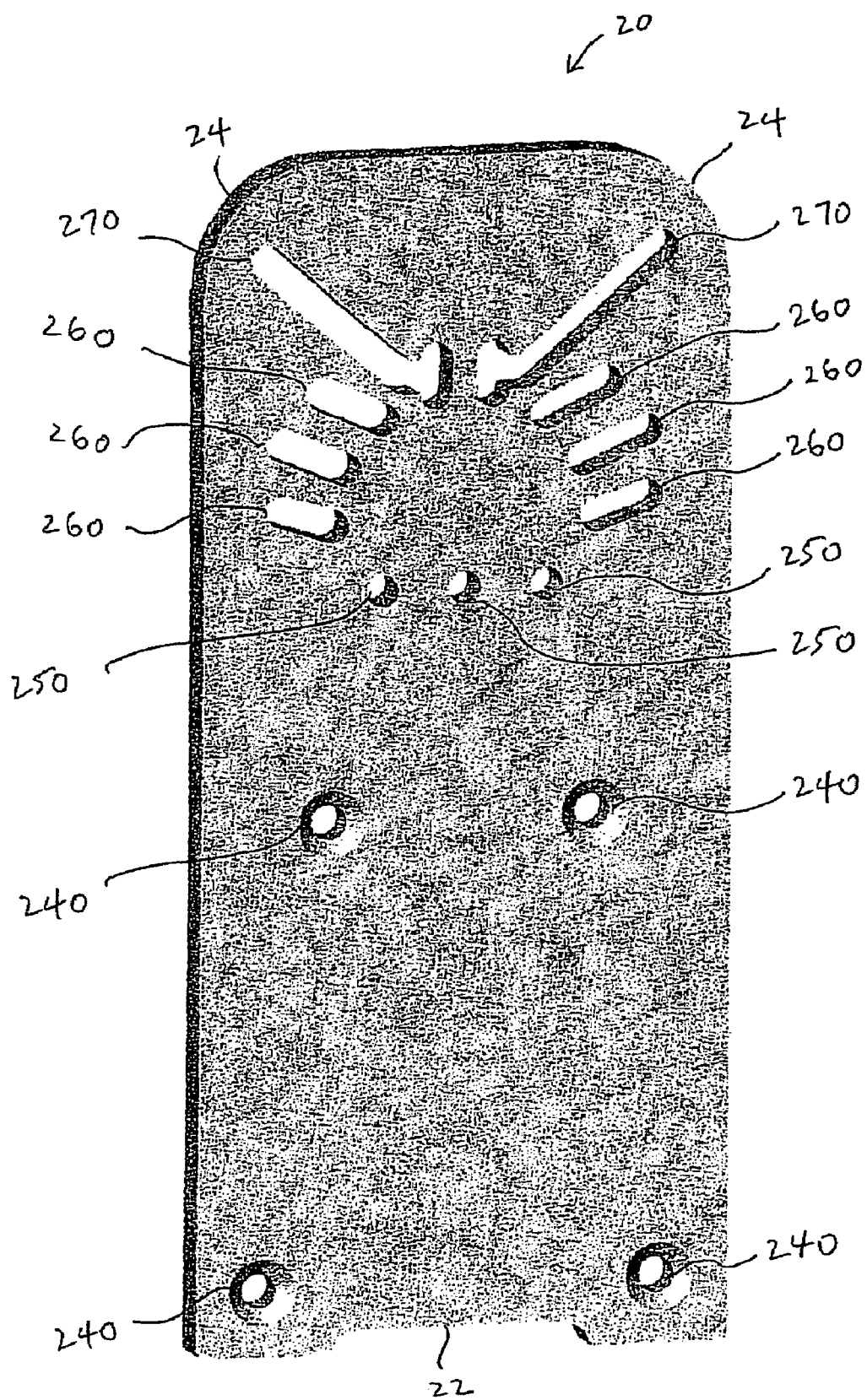
FIG. 2 shows an isometric view of an end plate in the animal restraint shown in FIG. 1.

FIG. 2 shows an isometric view of the first upright plate 20. According to the present aspect of the invention, the first and second upright plates 20 and 30 are substantially identical to each other. However, it would also be possible to use non-identical plates without departing from the spirit of the invention. The plate 20 is substantially rectangular in shape, with flat inner and outer surfaces. FIG. 2 shows the outer surface of the plate 20. The bottom of the plate 20 includes a shallow cutout section 22 that facilitates handling of the assembled restraint 10. The upper corners of the plate 24 are rounded. It should be noted that the shape and placement of the cutout 22 or other features such as the holes and slots described below may be otherwise located on plates 20 and 30 within the context of the present invention.

The first plate 20 includes a number of holes and slots 240, 250, 260 and 270 that are used to mount bars 40 50, 60, and 70 to the plate 20. The second plate 30 provides a corresponding set of holes and slots. Thus, the techniques described below to mount the respective first ends of bars 40, 50, 60 and 70 to the first plate 20 are equally applicable in mounting the second ends of the bars to the second plate 30.

The bottom four holes 240 are screw holes, arranged in a substantially trapezoidal configuration. The screw holes 240 are used to screw the spacer bars 40 to the inner surface of the plate 20. The screw holes 240 are countersunk so that the screw heads lie below the outer surface of the plate 20 in the assembled restraint 10. Three substantially collinear holes 250 are used to mount the floor bars 50 to the plate 20. Six short slots 260 are used to mount the side bars 60 to the plate. Two elongated slots 270 are to mount the gate bars 70. The mounting of bars 40, 50, 60 and 70 to the first plate 20 is discussed in further detail below.

Figure 5:
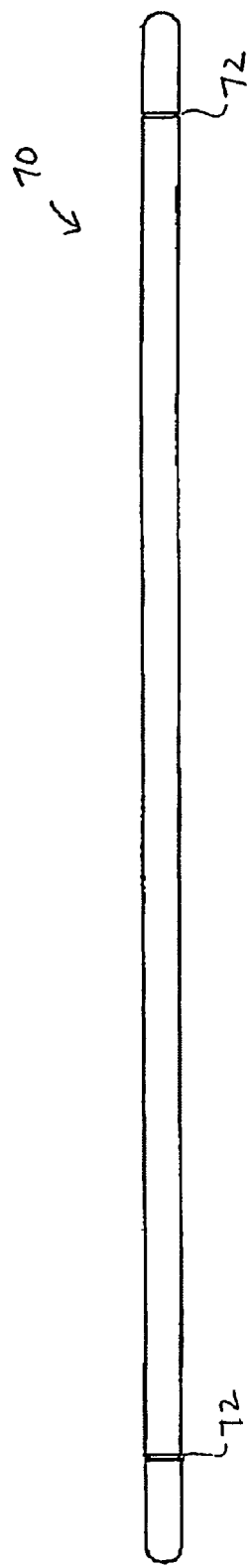
FIGS. 3 through 5 show, respectively, elevation views of a spacer bar, a floor bar, and a gate bar used in the animal restraint shown in FIG. 1.
Figure 4:
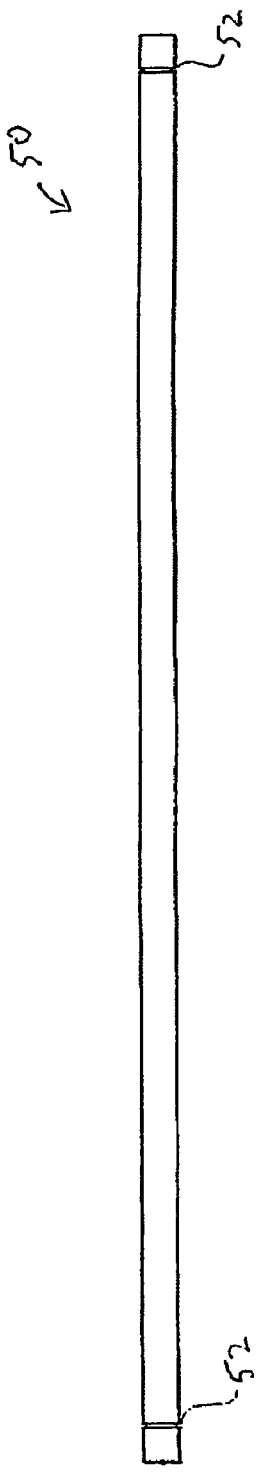
Figure 3:
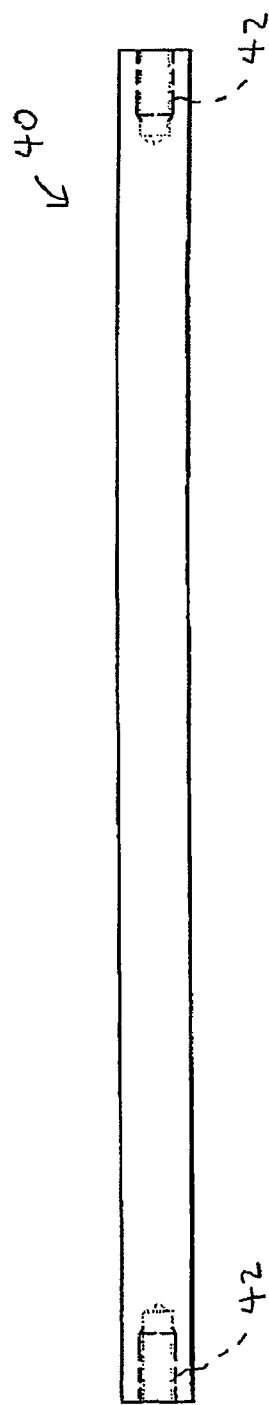

FIGS. 3 through 5 show elevation views of a spacer bar 40, a floor bar 50, and a gate bar 70 used in the restraint system shown in FIG. 1. The same bars are used for both the floor bars 50 and the side bars 60. As mentioned above, the bars 40, 50, 60 and 70 have a substantially cylindrical shape, however, they could also be of any other rod-like configuration.

Figure 6:
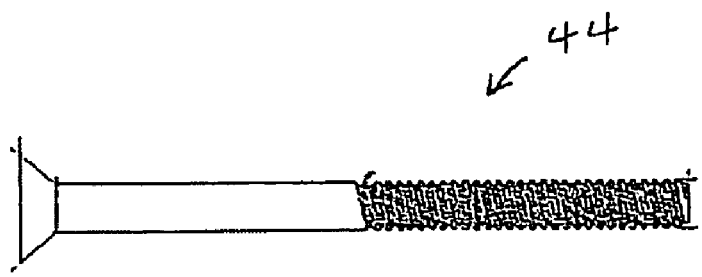
FIGS. 6 through 8 show elevation views, respectively, of a screw, a retaining ring, and an E-style retaining clip used in the animal restraint shown in FIG. 1.

As shown in FIGS. 3 through 5, the spacer bar 40 has a larger diameter than the floor bar 50 and gate bar 70. At each end of the spacer bar 40 there is provided a threaded aperture 42 for receiving a screw, such as screw 44 shown in FIG. 6. The spacer bar 40 has squared off ends that butt up against the inner surfaces of the upright plates 20 and 30 in the assembled restraint 10.

The floor bar 50 and gate bar 70 have the same diameter, but the gate bar 70 is slightly longer than the floor bar 50. The length of the floor bar 50 is such that, in the assembled restraint 10, the squared off ends of the floor bar 50 are substantially flush with the outer surface of the upright plates 20 and 30. The length of the gate bar 70 is such that, in the assembled restraint 10, the rounded ends of the gate bar 70 protrude outside of the upright plates 20 and 30. The rounded ends of the gate bar 70 can be used as external handles, allowing a laboratory technician to maneuver the gate bar 70 from outside of the restraint 10. In addition, the rounded ends of the gate bar can be used as handles to transport the restraint 10, with or without an animal contained in the enclosure.

Figure 7:
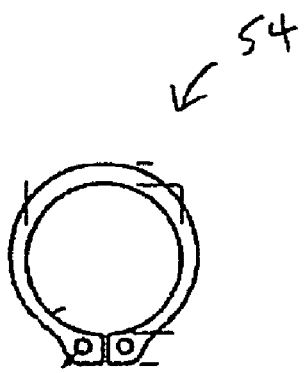
Figure 8:
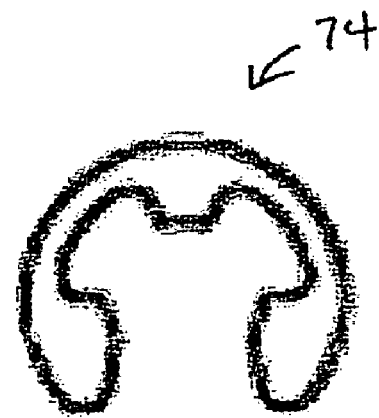

The floor bar 50 includes a circumferential groove 52 at each end that is dimensioned to receive a retaining ring, such as the retaining ring 54 shown in FIG. 7. The gate bar 70 also includes at each end a circumferential groove 72 to receive an E-style retaining clip, such as the clip 74 shown in FIG. 8. When the retaining ring 54 and the retaining clip 74 are seated in their respective grooves 52 and 72 in the floor bar 50 and gate bar 70, it will be seen that they function as flanges that butt up against the inner surfaces of the first and second plates 20 and 30, holding the bars 50 and 70 in position between the plates 20 and 30. Because of the heavier demands placed on it, the gate bar retaining clips 74 may be larger than the retaining rings 54 used for the floor bars 50 and space bars 60.

Figure 9:
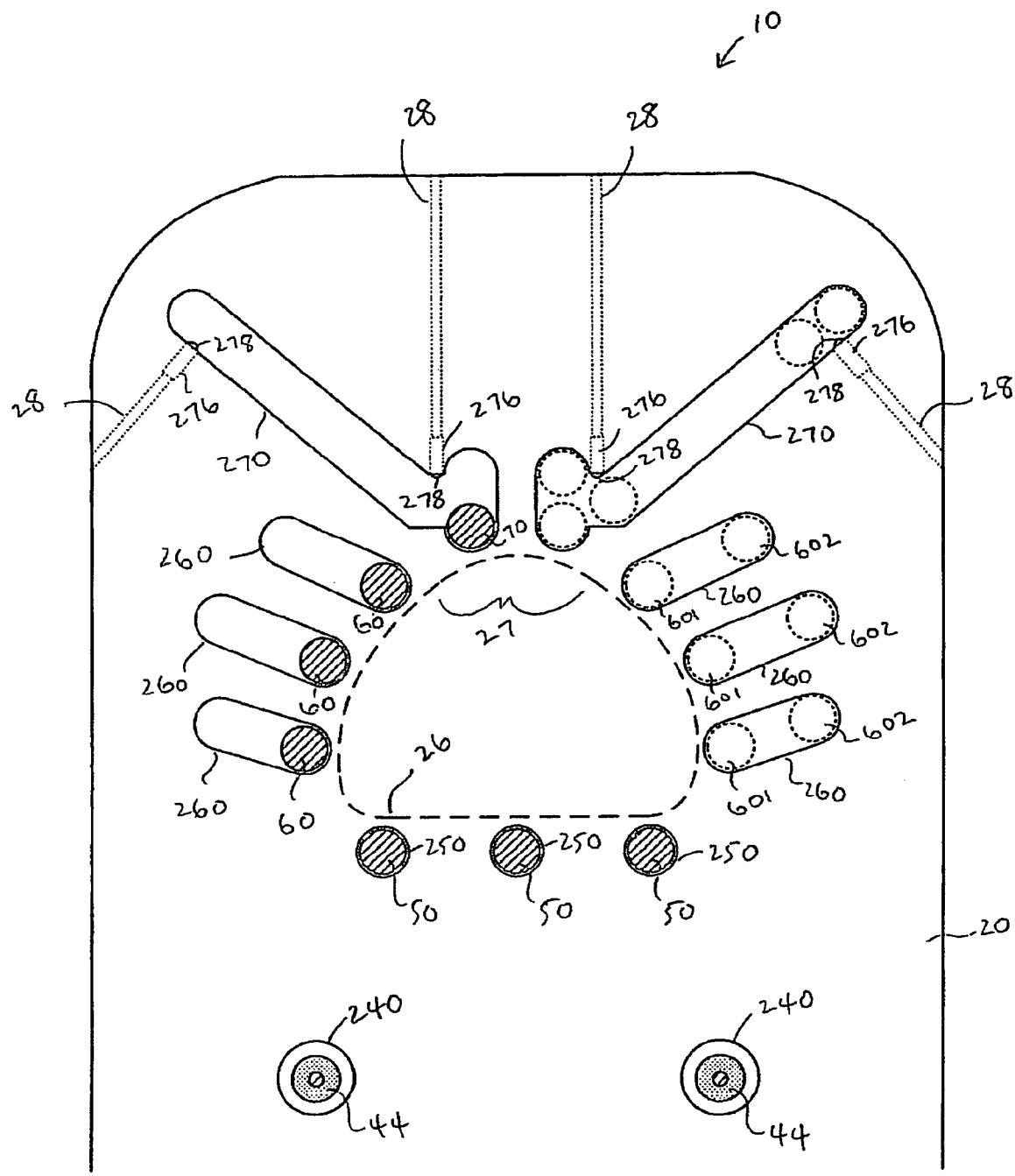
FIG. 9 shows a partial side view of an upper portion of the animal restraint shown in FIG. 1.

FIG. 9 shows a partial elevation view of the upper portion of the first upright plate 20 in the assembled restraint system 10, and illustrates the construction and operation of the restraint system 10. The shape of the enclosure formed by floor bars 50, side bars 60, and gate bars 70 is shown by broken line 26. The shape of the enclosure 26 may be varied, depending on the size and shape of the animal, without departing from the spirit of the invention. As discussed above, the spacer bars 40 are mounted into position using screws 44, shown in FIG. 8, that are threaded through a screw holes 240. The floor bars 50 and side bars 60 are prepared for mounting by attaching retaining rings 54, shown in FIG. 7, onto the circumferential grooves 52 at each end of each bar 50.

Holes 250 in plate 20 are dimensioned to closely receive the ends of the floor bars 50. The retaining clips 54 prevent the floor bars 50 from passing all the way through holes 250. The circumferential grooves 52 are positioned on the floor bars 50 such that the ends of the floor bars 50 are substantially flush with the outer surface of the plate 20.

Slots 260 in plate 20 are dimensioned to closely receive the ends of the side bars 60, but to allow the ends of the side bars 60 to slide freely within the slots 260. The retaining clips 54 prevent the side bars 60 from passing all the way through slots 260. The ends of the side bars 50 are substantially flush with the outer surface of the plate 20.

The right side of FIG. 9 illustrates the range of movement of the side bars 60 within slots 260. Specifically, FIG. 9 shows, in broken lines, the innermost and outermost positions 601 and 602 of each side bar 60 within its respective slot 260. Each side bar 60 floats between these two positions 601 and 602. The range of movement may be increased or decreased by modifying the length of the side bar slots 260.

It will be seen in FIG. 9 that each side bar slot 260 is downwardly sloped from its outer end towards its inner end in a generally radial direction relative to the enclosure 26. Thus, the weight of the side bars 60 will tend to pull each side bar 60 towards its innermost position 601 within its respective slot 260. The amount of inward force may be modified, as desired, by changing the slope angle of the slots 26 or by changing the weight of the side bars 60.

Figure 10:
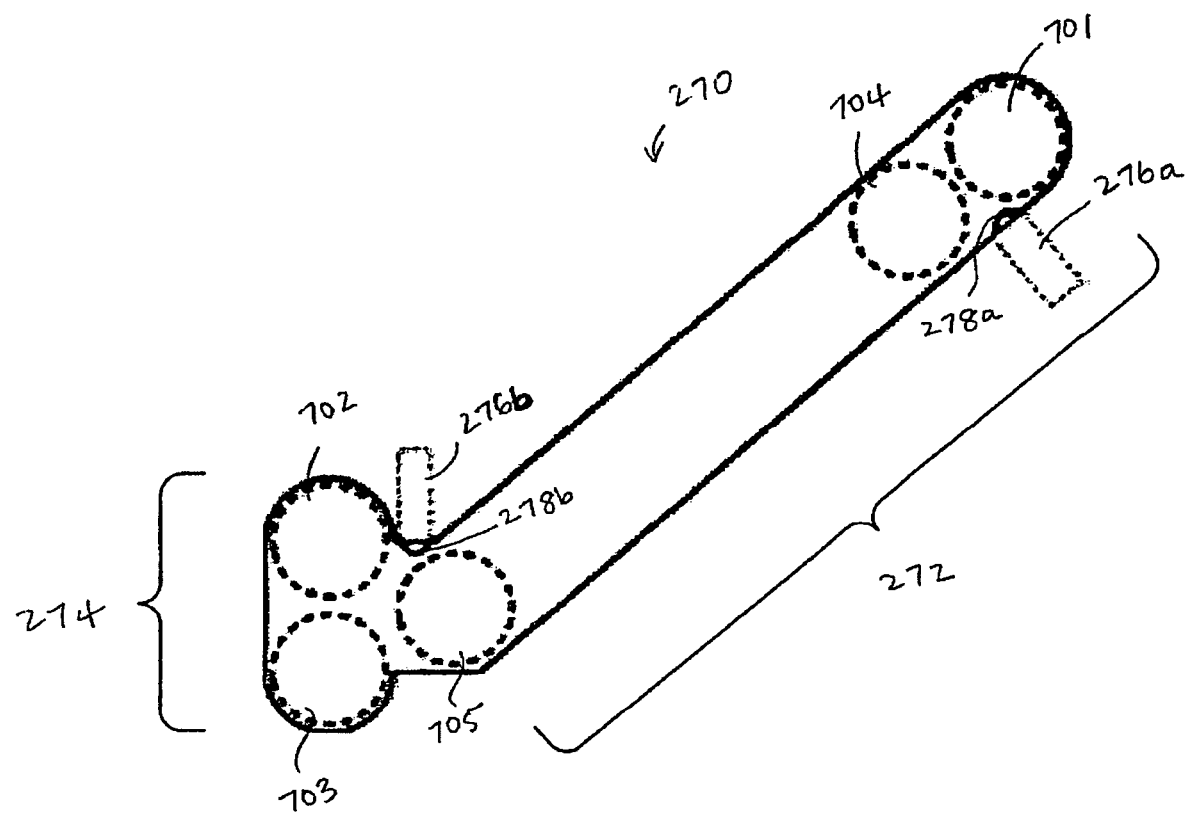
FIG. 10 shows a closeup view of a gate bar guide slot used in the animal restraint shown in FIG. 1.

FIG. 10 shows a closeup view of the right guide slot 270 shown in FIG. 9. The left and right guide slots 270 shown in FIG. 9 are mirror images of each other. Thus, the following discussion applies equally to the left guide slot. Each guide slot 270 defines a path along which the gate bar 70 travels from a first, open position to a second, closed position. The guide slot 270 includes a long sloped section 272 that feeds into a short vertical section 274. The sloped section 272 slopes downward from the outer end of the guide slot 270 to its inner end, in a generally radial direction relative to the enclosure 26. The length of the sloped section 272 and the amount of slope can be modified without departing from the spirit of the present invention.

The outer end of the guide slot 270 defines the open position 701 of the gate bar 70. The short vertical section 274 defines a range of vertical movement for the gate bar 70 when it is in its closed position. As shown in FIG. 10, the upper bound 702 for this range of vertical movement is defined by the upper end of the vertical section 274, and the lower bound 703 is defined by the lower end of the vertical section. The range of movement of the gate bar 70 within the vertical section 274 may be increased or decreased by modifying the length of the vertical section 274. In addition, it may be desirable in certain situations to use a sloped slot instead of a vertical slot for section 274.

Figure 11:
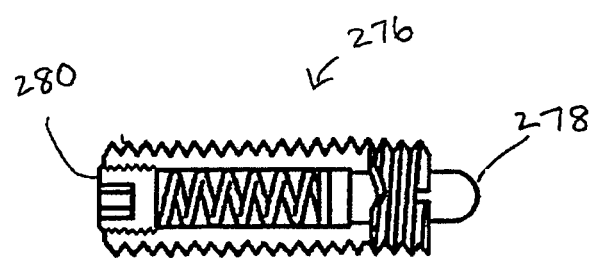
FIG. 11 shows a cross section of a spring-loaded plunger used in the animal restraint shown in FIG. 1.

As mentioned above, the present aspect of the invention provides releasable locks for securing each gate bar 70 in its open and closed positions. In FIG. 10, the releasable locks are provided by spring-loaded plungers 276*a* and 276*b*. FIG. 11 shows a cross section of a Vlier-type spring-loaded plunger 276 suitable for use as releasable locks 276*a* and 276*b*. The plunger 276 includes a rounded tip 278 that is deflectable into the body of the plunger 76. The plunger 276 includes a screw 280 for adjusting the amount of force required to deflect the plunger tip 278. FIG. 9 shows four tap locations 28 in plate 20 for mounting spring-loaded plungers 276 into the plate 20.

Returning to FIG. 10, it will be seen that plunger tips 278*a* and 278*b* are positioned to protrude into the guide channel. The upper plunger tip 278*a* is positioned to hold the gate bar 70 in its open position 701. The lower plunger tip 278*b* is positioned to hold the gate bar 70 in the vertical section 274 of the guide slot 270. The plunger tips 278*a* and 278*b* are adjusted to hold each gate bar 70 securely in its open and closed positions, while allowing a laboratory technician to use one hand to grasp a middle portion of the gate bar 70 and pull it past the plunger tips 278a and 278b to release the gate bar 70 from its open and closed positions. The plunger tips 278a and 278b provide a clicking action to indicate to the technician that the gate bar 80 is securely in its open or closed position. Once clear of the plunger tips 278a and 278b, the gate bar 70 slides freely between positions 704 and 705.

It will be seen that the sloped section 272 of the guide slot 270 feeds into a central region of the vertical section 274. In order for the gate bar 70 to be moved from the vertical section 274 back into the sloped section 272, the gate bar 70 must be substantially centered within the vertical section 274. This structural aspect of the guide slot 270 prevents the gate bar 70 from being accidentally released from its closed position, particularly in combination with lock 276b. An animal held in the restraint would typically only be able to exert an upward force on the gate bar 70 when the gate bar 70 is contained within the vertical section 274. It would be difficult for an animal to be able to position the gate bar 70 at the mouth of the sloped section 272 and to exert a sufficient sideways force to release the gate bar 70 from the vertical section 274.

The restraint system 10 may be loaded and unloaded as follows. To load the restraint system 10, each gate bar 70 is moved into its fully open position 701, if it is not there already. As discussed above, spring-loaded plunger tips 278a hold each gate bar 70 in its open position. Each gate bar 70 may be maneuvered using only one hand grasping the middle of the gate bar 70.

It will be seen that when the gate bars 70 are in their open position, they are clear of an opening 27 at the top of the enclosure 26. A laboratory animal is then loaded into the enclosure 26 through this opening 27. If necessary, side bars 60 can be pushed out of the way to make more room for loading the animal into the restraint. Once the animal is in position, a user such as a laboratory technician can use one hand to hold the animal in position and use the other hand to move each gate bar 70 from its open position to its closed position. Once each gate bar 70 has been latched into its closed position, the animal may be left for a period of time to allow the animal to become settled within the restraint. Because the side bars 60 and gate bars 70 float within their respective slots 260 and 274, the animal has some range of movement, thus relieving some of the stress of being restrained. This alleviation of stress is reflected in reduced pulse rate, breathing rate, and the like. For certain tests, this reduction in animal stress can be significant.

When the testing procedure is completed, the user releases the gate bars 70, pulling them back into their open position. One hand may be used to manipulate each gate bar 70 while the other hand can be used to soothe or control the animal. Once each gate bar 70 has been locked into its open position, the laboratory technician can use both hands to remove the animal from the restraint 10.

It will be seen that an animal restraint system 10 according to the present invention has a number of useful features. In addition to being operable by a single person, the restraint system 10 is easy to clean and sterilize, as needed. In addition, the restraint system 10 is easy to assemble, requiring only a screwdriver.

Figure 12:
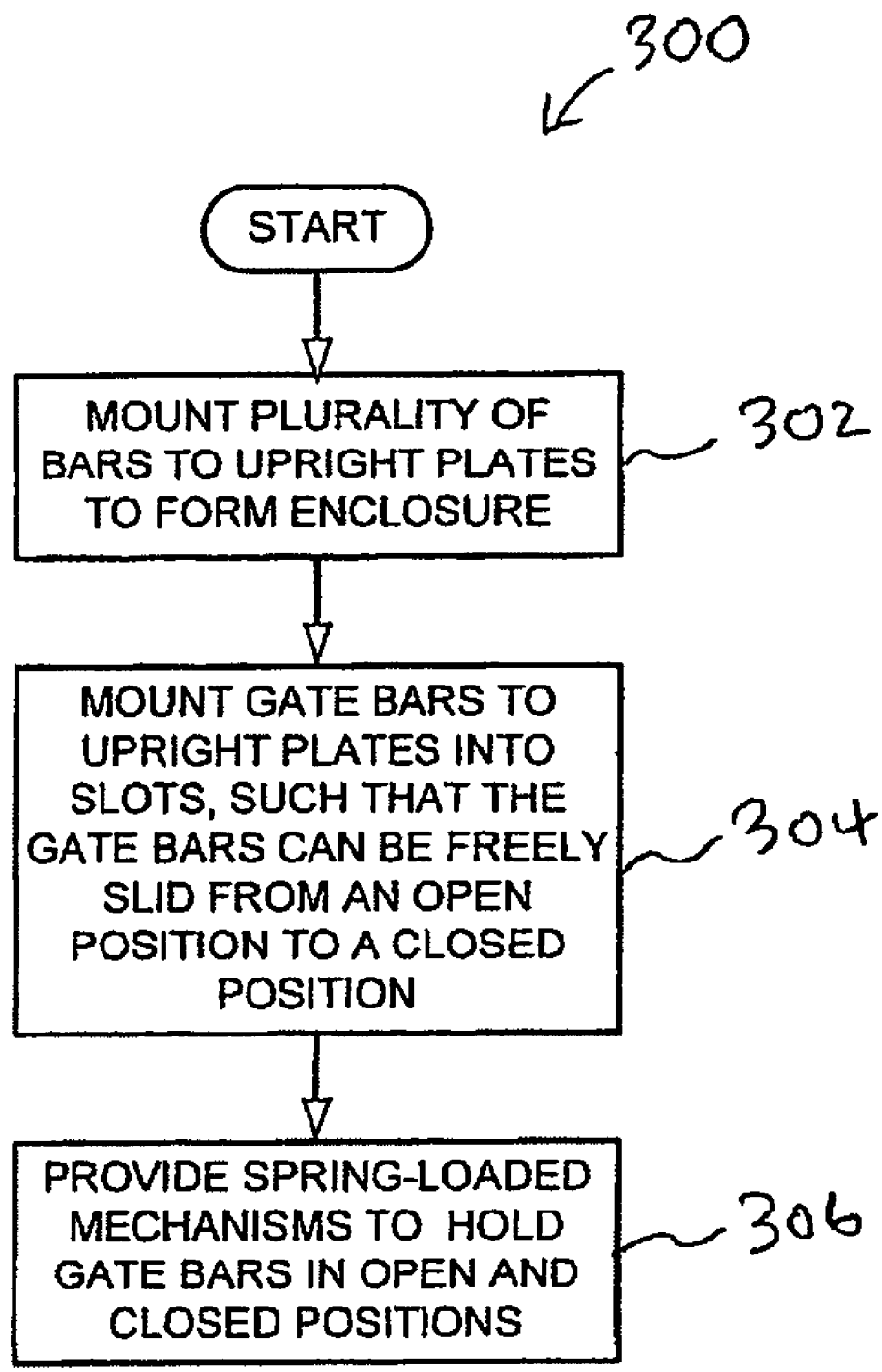
FIG. 12 shows a flowchart of a method according to a further aspect of the invention for restraining an animal.

FIG. 12 shows a flowchart of a method 300 according to a further aspect of the invention. In step 302, a plurality of bars are mounted to a pair of upright plates to form an enclosure.

In step 304, gate bars are mounted to the upright plates into guide slots, such that the gate bars can be freely slid from an open position to a closed position. In step 306, spring-loaded mechanisms are provided to hold the gate bars in their open and closed positions.

It will be appreciated that an animal restraint 10 according to the present invention may be advantageously used in a laboratory, but may also be used in other environments, including a veterinarian's office or animal hospital. Also, it will be appreciated that the number, shape, and size of the upright plates 20 and 30 and bars 40, 50, 60 and 70 and mounting holes and slots 240, 250, 260 and 270 may be freely modified, as needed, to accommodate animals of different sizes and shapes.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An animal restraint, comprising:
   a first upright plate and a second upright plate, each having a planar inner surface and a planar outer surface;
   a plurality of bars, each having a first end mounted to the planar inner surface of the first plate and a second end mounted to the planar inner surface of the second plate, each of the plurality of bars spaced in relation to the other bars such that the bars form an enclosure dimensioned to closely receive an animal, the enclosure having an opening for accommodating at least one gate bar;
   at least one gate bar having a first end that slidably contacts the planar inner surface of the first plate, and a second end that slidably contacts the planar inner surface of the second plate, the gate bar being slidable along a defined path between a closed position, in which the gate bar blocks the opening in the enclosure, and an open position, in which the gate bar is clear of the opening; wherein the first end of the gate bar is slidably mounted into a first guide slot in the first plate and the second end of the gate bar is slidably mounted into a second guide slot in the second plate, each of the first and second guide slots having an outer end defining the open position of the gate bar and an inner end defining the closed position of the gate bar and each of the first and second guide slots is downwardly sloped from its outer end towards its inner end in a substantially radial direction relative to the enclosure.

2. The animal restraint of claim 1, wherein each of the first and second guide slots includes locks for releasably securing the gate bar in its open and closed positions.

3. The animal restraint of claim 2, wherein the locks comprise spring-loaded plungers mounted into the first and second plates, the tips of the spring-loaded plungers protruding into the guide slots.

4. The animal restraint of claim 2, wherein the inner end of each of the first and second guide slots terminates in a vertical slot, thereby providing the gate bar with a vertical range of movement when it is in its closed position.

5. The animal restraint of claim 4, wherein each of the first and second guide slots feeds into a central section of the vertical slot, such that the gate bar must be substantially centered within the vertical slot in order to release the bar from its closed position.

6. A method for restraining an animal, comprising:
(a) mounting a plurality of bars to a first plate and a second plate to form an enclosure that is dimensioned to closely receive an animal; and
(b) slidably mounting a first end of a gate bar to the first late and a second end of the gate bar to the second plate such that the gate bar is slidable along a defined path between a closed position, in which the gate bar blocks an opening in the enclosure, and an open position, in which the gate bar is clear of the opening in the enclosure; wherein step (b) includes slidably mounting the first end of the gate bar into a first guide slot in the first late and the second end of the gate bar into a second guide slot in the second late each of the first and second guide slots having an outer end defining the open position of the gate bar and an inner end defining the closed position of the gate bar and in step (b) each of the first and second guide slots is downwardly sloped from its outer end towards its inner end in a substantially radial direction relative to the enclosure.

7. The method of claim 6, further including: (c) mounting locks into the first and second plates for releasably securing the gate bar in its open and closed positions.

8. The method of claim 7, wherein in step (c) includes mounting spring-loaded plungers into the first and second plates such that the tips of the spring-loaded plungers protrude into the guide slots.

9. The method of claim 8, further including: providing the gate bar with a vertical range of movement when it is in its closed position.

* * * * *

UNITED STATES PATENT AND TRADEMARK OFFICE
CERTIFICATE OF CORRECTION

| | | |
|---|---|---|
| PATENT NO. | : 7,584,719 B2 | Page 1 of 1 |
| APPLICATION NO. | : 11/436922 | |
| DATED | : September 8, 2009 | |
| INVENTOR(S) | : Janet Dell John and Waldemar Ruediger | |

It is certified that error appears in the above-identified patent and that said Letters Patent is hereby corrected as shown below:

In the Specification:
Column 1
Line 3, Please insert the following headline under the title of the invention:
-- CROSS-REFERENCE TO RELATED APPLICATION --.

In the Claims:
Column 7, Claim 6
Line 5, "late" should read -- plate --;
Line 12, "late" should read -- plate --;
Line 14, "late" should read -- plate, --.

Signed and Sealed this

Twenty-eighth Day of September, 2010

David J. Kappos
*Director of the United States Patent and Trademark Office*